United States Patent
Keckalo et al.

(10) Patent No.: US 11,431,161 B2
(45) Date of Patent: Aug. 30, 2022

(54) ELECTRIC POWER DISTRIBUTION SECTIONALIZING IN HIGH-RISK AREAS USING WIRELESS FAULT SENSORS

(71) Applicant: Schweitzer Engineering Laboratories, Inc., Pullman, WA (US)

(72) Inventors: David Walter Keckalo, Spokane, WA (US); Kei Hao, Anaheim, CA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/186,922

(22) Filed: Feb. 26, 2021

(65) Prior Publication Data

US 2021/0281062 A1    Sep. 9, 2021

Related U.S. Application Data

(60) Provisional application No. 62/986,236, filed on Mar. 6, 2020.

(51) Int. Cl.
  *H02H 3/00*    (2006.01)
  *H02H 3/06*    (2006.01)
  *H02H 1/00*    (2006.01)

(52) U.S. Cl.
  CPC .......... *H02H 3/06* (2013.01); *H02H 1/0007* (2013.01); *H02H 1/0092* (2013.01)

(58) Field of Classification Search
  None
  See application file for complete search history.

(56) References Cited

U.S. PATENT DOCUMENTS

| | | | |
|---|---|---|---|
| 4,454,556 A | 6/1984 | Depuy | |
| 5,513,061 A | 4/1996 | Gelbien | |
| 5,896,302 A | 4/1999 | Goodpaster | |
| 5,973,899 A | 10/1999 | Williams | |
| 7,414,819 B2 | 8/2008 | Lee | |
| 7,714,735 B2 | 5/2010 | Rockwell | |
| 7,725,295 B2 | 5/2010 | Stoupis | |
| 8,067,946 B2 | 11/2011 | Muench | |
| 8,526,156 B2 * | 9/2013 | Schweitzer, III | H02H 7/263 361/115 |
| 8,665,102 B2 | 3/2014 | Salewske | |
| 9,257,833 B2 | 2/2016 | Allen | |

(Continued)

OTHER PUBLICATIONS

PCT/US2021/020391 International Search Report and Written Opinion of the International Searching Authority dated May 19, 2021.

*Primary Examiner* — Stephen W Jackson
(74) *Attorney, Agent, or Firm* — Richard M. Edge

(57) ABSTRACT

Disclosed herein are systems and methods for safe electric power delivery protection within a high-risk area while maintaining electric power availability in non-faulted areas. Fault signals from wireless sensors are used at a recloser to block reclosing onto a faulted high-risk zone. Fault signals from wireless sensors are used at a recloser to permit reclosing when the reclosing operation will not close onto a fault location within the high-risk zone. Portions of the power system may be selectively openable by sectionalizers. When a fault is reported by a wireless sensor as being on a portion of the power system selectively openable, a recloser may be permitted to attempt a reclose operation affecting the high-risk zone and the selectively openable portion.

20 Claims, 8 Drawing Sheets

(56) References Cited

U.S. PATENT DOCUMENTS

| | | |
|---|---|---|
| 2006/0039094 A1 | 2/2006 | Brucker |
| 2010/0036538 A1 | 2/2010 | Stergiou |
| 2013/0163132 A1 | 6/2013 | Schweitzer |
| 2014/0277804 A1 | 9/2014 | Witte |

* cited by examiner

ELECTRIC POWER DISTRIBUTION SECTIONALIZING IN HIGH-RISK AREAS USING WIRELESS FAULT SENSORS

RELATED APPLICATION

This application claims priority to U.S. Provisional Application No. 62/986,236 titled "Electric Power Distribution Sectionalizing in High-Risk Areas" naming David Keckalo and Kei Hao as inventors, and filed on 6 Mar. 2020, which is hereby incorporated by reference herein in its entirety.

TECHNICAL FIELD

This disclosure relates to sectionalizing in an electric power distribution system. More particularly, this disclosure relates to safe sectionalizing in a high-risk zone of the electric power distribution system using wireless line-mounted sensors.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
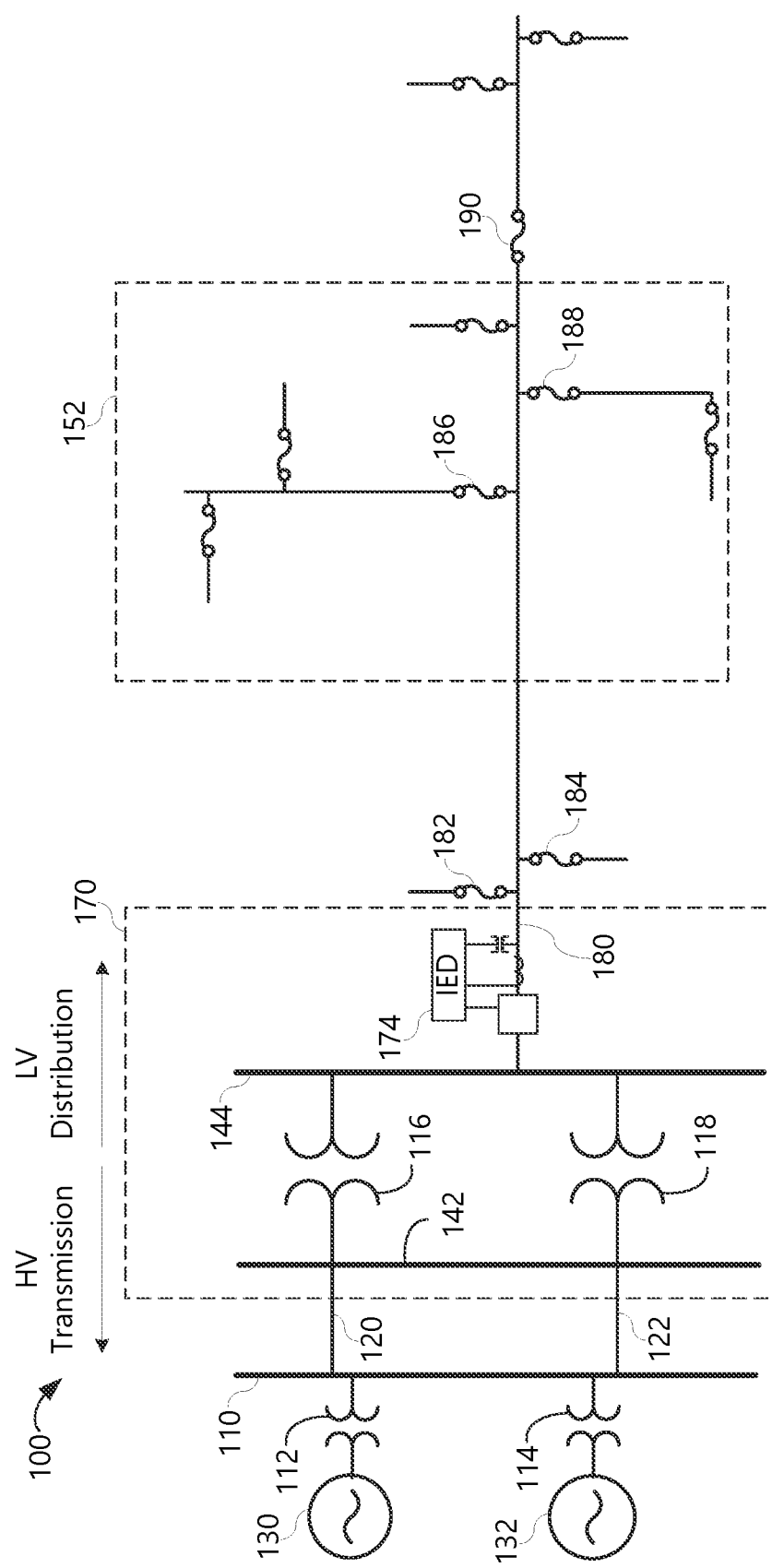
FIG. 1 illustrates a representative one-line diagram of an electric power system including a high-risk area.

Electric power delivery systems are used throughout the world to generate, transmit, and distribute electric power to loads for consumption. To monitor, protect, and automate the electric power delivery system and its equipment, intelligent electronic devices (IEDs) may be used to obtain and process information from the electric power delivery system, perform monitoring and protection functions, and effect control operations on the electric power delivery system equipment. Typically, IEDs are located at substations and near major equipment.

Today's distribution protection systems sacrifice speed to achieve selectivity in order to provide reasonable service continuity and limit the number of affected customers. The tradeoff uses time delays to establish selectivity when many protection devices (such as protective relays, reclosers, and fuses) in series detect the same fault current. To ensure selectivity, the upstream device (backup) must include an intentional coordination delay to allow any downstream device enough time to clear a fault. The time-overcurrent curve of the backup device is set slower than the downstream protection devices, including some margin.

Generally, reclosers are a class of electric power system equipment similar to circuit breakers, which automatically trip to open a section of the power system upon detection of a fault such as an overcurrent condition that persists for a determined time. Unlike circuit breakers, however, reclosers attempt to close the section of the power system back in after a delay. If the overcurrent condition is again detected after the reclose, then the recloser may again trip to open the power system. Reclosers may be configured to continue attempting to close back in for a determined number of attempts or a time period. If the overcurrent condition is not detected, the recloser remains closed. However, if the overcurrent condition persists, the recloser may remain in the trip state, known as "recloser lockout." Reclosers may be controlled using an IED such as a recloser controller. Reclosers may be configured for primary protection for the immediate zone downstream thereof, and/or as backup protection for primary protection devices.

When a fault occurs in the zone immediately downstream of a protective device (such as, for example, a circuit breaker, recloser, fuse, or the like), that device may act as the primary protection. However, a coordination delay designed for a backup protection device may also be active, in case primary protection is unable to clear the fault. Backup protection is typically coordinated with a delay that is longer than a delay expected for the primary protection to clear the fault. Accordingly, failure of a primary protection extends persistence of the fault condition.

When a fault occurs on a distribution feeder, the high current level can result in equipment damage, and expose bystanders to an arc-flash burn hazard at the fault location. The energy released is proportional to the amount of time the fault persists and the square of the fault current. While fault magnitude generally cannot be controlled on a multi-grounded system, the fault duration can be managed. The energy released can cause severe consequences if the protection system does not clear the fault quickly, especially in high-risk environments. Therefore, reducing fault-clearing time on a distribution feeder is a critical path to reducing the energy released during a fault.

The main incentive for speeding up protection schemes in distribution feeders is public safety. A fault or downed conductor poses a hazard through direct or indirect electrical contact and an ignition source for wildfires. The potential for injury and property damage increases when faulted conductors are not quickly de-energized. Other benefits include reducing stress on the distribution feeder and equipment, and improving power quality and reliability.

Electric power systems may further be equipped with sectionalizers to assist in fault isolation. A sectionalizer is a device that automatically isolates a line segment, but only after an upstream device has interrupted the fault current. That is, a sectionalizer automatically trips or opens when power has been removed from the section of line by an upstream device. Sectionalizers generally cannot interrupt a fault current. Sectionalizers may be configured to open after a predetermined number of interruptions caused by the upstream device. For example, a sectionalizer configured with a count of one will open after a single interruption by an upstream device. Whereas a sectionalizer configured with a count of two will open after two interruptions (for certain sectionalizers, the interruptions must occur within a predetermined time) by the upstream device. Sectionalizers may operate in different modes. Under a first mode, when a fault is cleared while the reclosing device is open and the sectionalizer has not reached its preset count, the sectionalizer count resets after the circuit is successfully reclosed. In another mode, if a fault persists beyond the sectionalizer when the circuit is reclosed, then the fault current counter in the sectionalizer again prepares to count the next opening of the reclosing device. In yet another operating mode, with the sectionalizer set to trip during the reclose interval following the second-to-last tripping operation of the reclosing device, the sectionalizer opens before the reclosing device closes the last time, thus, the reclosing device recloses successfully because the sectionalizer is open, isolating the faulted line section and avoiding lockout.

A solution to reduce fault duration, at least at specific areas, is to sacrifice selectivity to speed up tripping. Although this is a solution that is only acceptable under certain circumstances, this disclosure shows that it is possible to speed up protection tripping without sacrificing selectivity under some other environmental conditions. This disclosure also describes the use of wireless protection sensors (WPSs) to achieve speed without sacrificing selectivity. It describes how WPSs can reduce fault duration by identifying a faulted line segment in high-risk areas and communicating the information to a relay/recloser control with minimal latency. With real-time knowledge of where a fault is occurring, the relay logic can adaptively enable a fast time-overcurrent curve and/or change the reclosing sequence that coordinates with downstream devices. Therefore, by adaptively changing the tripping speed, the feeder protection reduces the fault energy released. This reduces hazard levels and can minimize the negative impact of faults in high-risk areas.

A one-line diagram of a typical radial distribution system is shown in FIG. 1. In this example, a distribution feeder 180 emanates from a circuit breaker attached to the substation bus 144. The feeder breaker is controlled by a protective relay (IED) 174 that trips during overcurrent conditions caused by downstream faults, thus protecting the conductors and substation equipment from fault damage and isolates the faulted line from the rest of the distribution bus. Typically, the feeder main line is a three-phase circuit with lateral branches that tap off the main line. The branches can be one-, two-, or three-phase circuits. Utilities often install pole-mounted reclosers (with accompanying recloser controls), sectionalizers, and fuses along the distribution feeder to interrupt faults on downstream segments of the feeder and isolate the faulted segment. It is common practice to use fuses on the laterals to isolate faulted branches of the feeder.

The illustrated electric power delivery system 100 may be used as an example of a system that may benefit from the embodiments described herein. Electric power may be generated by generation sites 130, 132, which supply electric power to a transmission bus 110 via transformers 112, 114. Electric power may be transmitted via transmission lines 120, 122 to bus 142 at substation 170. Transformers 116, 118 may reduce voltage of the electric power from bus 142 to distribution bus 144. Feeder 180 may distribute electric power from distribution bus 144 to various loads via lines protected by fuses 182, 184, 186, and 188. Portions of the feeder may also be protected using fuse 190.

Although not separately illustrated, various of the electric power delivery system equipment may be monitored or protected by various IEDs. For example, generators may be monitored and protected by generator IEDs. Transformers, buses, transmission lines, and the like may be monitored and protected by respective IEDs. Feeder 180 may be monitored and protected using IED 174, which obtains electric power signals from feeder 180 using CTs, PTs, and the like; and may effect control of the electric power system by control of a circuit breaker.

The electric power distribution system of FIG. 1 includes a high-risk area 152. A high-risk area requires specific protection schemes in order to mitigate the impact of the hazards of the area. For example, a utility operating a feeder in a high-risk wildfire area may require the feeder relay or recloser(s) to trip quickly for any detected fault and suspend reclosing in that zone during dry season to reduce the risk of wildfire.

Disabling reclosing reduces fault dwell time, as do additional trip speed-up improvements. The trip speed-up and reclose blocking schemes can be applied to high-risk zones, either seasonally or permanently in order to protect against the specific hazards presented in the high-risk area. It should be noted that a "high-risk zone" as used herein refers to portions of an electric power delivery system located within a high-risk area.

Speeding up trip and blocking reclosing results in some disadvantages. For example, every fault condition (or even some non-fault anomalies such as overcurrent conditions) necessarily results in a permanent feeder outage, that requires additional procedures before power can be restored. These outages require time-consuming line patrols to find and correct the cause of the fault. If the fault were indeed temporary or the condition causing the trip was an anomaly, there may be nothing for the repair crew to find or repair. Accordingly, what is needed is a system and method to maintain adequate protection in a high-risk area while reducing the outage area or duration. It should be noted that reducing the outage area will decrease the amount of equipment that must be inspected before switching the power back on for the area, thus reducing the outage duration.

In accordance with various policies related to protection of electric power delivery systems, new protection schemes should "do no harm" when compared with the scheme that it is replacing. Radio communications are vulnerable to failure or malfunction, resulting in either a false positive (incorrect fault declaration) or a false negative (missing fault declaration). The possibility of a false positive is small in comparison with the possibility of a false negative. Failure or malfunction of radio communications generally depend on factors mostly related to the radio signal path, interfering signals, and environmental conditions. The disclosures herein provide systems and methods that maintain sensitive and fast tripping for high-risk areas while also reducing the outage area and duration using signals from wireless sensors. Given the uncertainty in communication reliability from wireless sensors, the systems and methods herein take into consideration the use of such communications for permissive roles and for blocking roles.

In general, for conditional protective actions that would increase risk, using wireless communications in a permissive role is acceptably safe. For example, if a system is configured to use a fault signal from a line-mounted device using wireless communication for reclosing, the reclosing would remain in a disabled state in the case of a missing signal from the line-mounted device.

Similarly for conditional protective actions that would decrease risk, using wireless communications in a blocking role is acceptably safe. For example, if a system is configured to use a fault signal from a line-mounted device using wireless communication as a blocking signal for fast time overcurrent element, the fast time overcurrent element would remain enabled in case of a missing signal from the line-mounted device.

The use of wireless signals in permissive and blocking roles as generally introduced above will be described in further detail hereafter as particular examples of the embodiments described herein.

Figure 2:
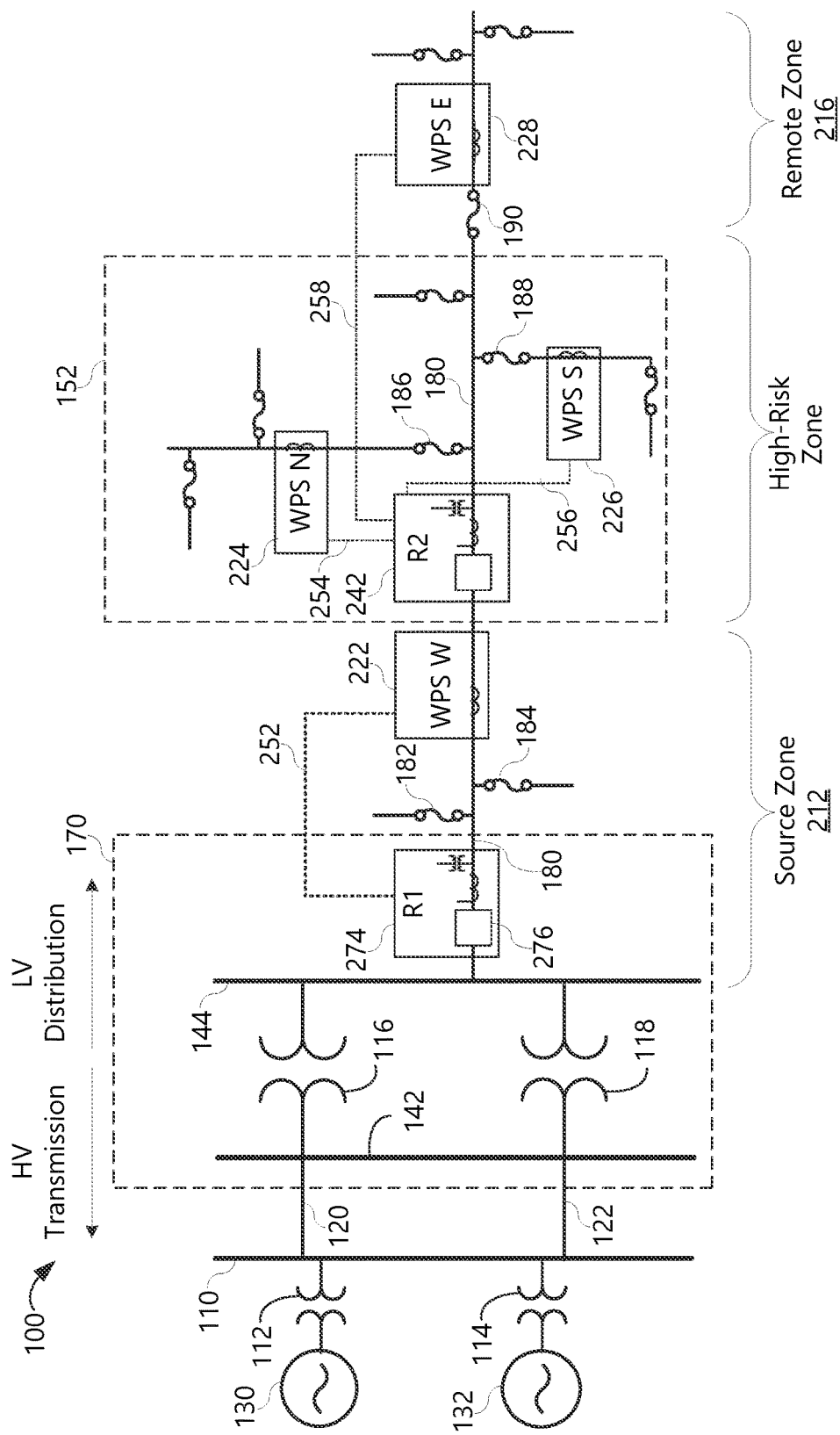
FIG. 2 illustrates a representative one-line diagram of an electric power system including a high-risk area and wireless sensors.

FIG. 2 illustrates the one-line diagram of FIG. 1, separated into three segments. The source zone 212 is protected by a substation recloser 274, and this zone extends to recloser 242. Recloser 274 may consist of a variety of equipment and devices. As illustrated, the recloser 274 includes a switching device 276 capable of interrupting current (tripping) and closing upon receipt of a command to do so from a controller. The recloser 274 may also include an IED (such as IED 174 of FIG. 1) that obtains electric power system signals, determines a condition, and sends trip and/or close commands to the switching device 276. Generally, reclosers 274 may be packaged together or separately. In various embodiments, the switching device may be installed in a switchyard, on overhead power lines, on underground power lines, or the like; while the IED may be housed in a control station or remotely near the switching device, such as in a cabinet on a pole. The IED may be in communication with the switching device to issue trip and/or open commands and receive status indications (open/closed) from the switching device.

As illustrated in FIG. 2, a high-risk zone 152 is bounded by recloser 242 on the source side and Fuse 190 on the remote (right) side. The high-risk zone 152 also includes various branches protected by fuses (e.g. 186, 188) and monitored by wireless devices (e.g. 224, 226). The high-risk zone 152 is protected using recloser 242, and receives secondary protection using recloser 274. That is, if a fault occurs anywhere downstream of recloser 242, then recloser 242 would be the first to act on the fault. If the fault persists, recloser 274 may act on the fault. Reclosers 242 and 274 may be coordinated for such protection. If coordination of the feeder protection is configured to minimize fault energy (e.g. using a definite-time overcurrent element that trips quickly after a reclose attempt), then during critical environmental conditions a fast-tripping scheme with no reclosing may be used to minimize fault energy in the high-risk area. Thus, recloser 242 trips for any fault, even if a fuse is melting. The simultaneous fuse and recloser operations successfully reduce fault energy, but all customers beyond recloser 242 unnecessarily suffer an outage after the fault.

Furthermore, the protection coordination may be configured such that during standard environmental conditions a fuse-blowing scheme is enabled at recloser 242. The fuse-blowing scheme allows larger fuses to blow before recloser 242 can trip. That is, the recloser 242 may be configured with a time-overcurrent threshold that is longer than the threshold of one or more fuses. Thus, under a fault condition the fuse would open the faulted portion of the line (or branch) before the recloser would operate to remove power. This may result in a slower operating time, but would also reduce the amount of the system (or number of customers) to which power is removed. However, managing a seasonal change in protection coordination is inconvenient for systems that do not have remote configuration capability. Crews would need to be dispatched to each recloser for such reconfiguration.

By properly coordinating reclosers 274, 242, customers in the source zone will not see a service interruption for faults beyond recloser 242 because recloser 274 will not trip. However, recloser 274 must be configured such that when it does trip for a fault, it cannot be permitted to reclose because it provides backup protection for recloser 242 and the high-risk zone. The result is that all customers on the feeder will suffer an outage for any fault that trips recloser 274, including source-zone faults.

The probability of recloser 242 failure is small, but the non-reclose requirement at recloser 274 degrades service availability by converting any unfused main-line fault in the source zone into a permanent feeder outage. This increases the amount of power system (and customers) without power, even on non-faulted sections of the power system. In various instances, this tradeoff is necessary in extreme conditions such as those conditions leading to high wildfire volatility.

As illustrated in FIG. 2, wireless protection sensors (WPSs) may be used to improve protection coordination among the reclosers 274, 242 to retain safe protection in the high-risk zone and reduce the area of power outage in case of a protective action. Communications from the WPSs may be used to reduce impact on system availability without increasing fault energy.

Recloser 274 may be configured with a wireless receiver (or be in communication with a wireless receiver) to receive signals 252 from WPS 222 for the high-risk zone. In accordance with one embodiment, wireless communications 252 from the WPSs may be used to coordinate reclosing in the source zone while providing backup protection to the high-risk zone. As illustrated, the high-risk zone 152 is bounded by WPS 222 (on the feeder 180 between recloser 274 and recloser 242 of the high-risk zone 152) and WPS 228 (on the feeder 180 downstream of the high-risk zone 152). WPS 228 may be in a remote zone 216. In certain embodiments, the high-risk zone 152 may also include branches monitored by WPSs. For example, WPS 224 may be used to monitor a North branch, while WPS 226 may be used to monitor a South branch. WPSs 224, 226, and 228 may be configured to wirelessly communicate 254, 256, 258 power system conditions (such as, for example, a detected overcurrent or fault condition) detected thereby to recloser 242. Signals 252 from WPS 222 at the start of the high-risk zone may be transmitted to recloser 274. The signal from WPS 222 may allow for conditional reclosing of recloser 274. Generally, the reclosing function of recloser 274 can be enabled by default and blocked when WPS 222 indicates a fault. That is, upon detecting a fault condition, recloser 274 may trip open and reclose (following a predetermined delay), remaining closed if the fault condition has been cleared. However, if the fault condition is within the high-risk zone, then the reclosing should be avoided. A fault signal from WPS 222 would indicate that the fault is either within the high-risk zone or the remote zone 216. To ensure safety, reclosing at recloser 274 is blocked upon a fault detection signal from WPS 222, avoiding reclosing back onto a fault that may be in the high-risk zone 152. This is an example of a conditional protection of recloser 274 that can be modified using a fault signal from WPS 222 as a blocking signal.

Figure 3:
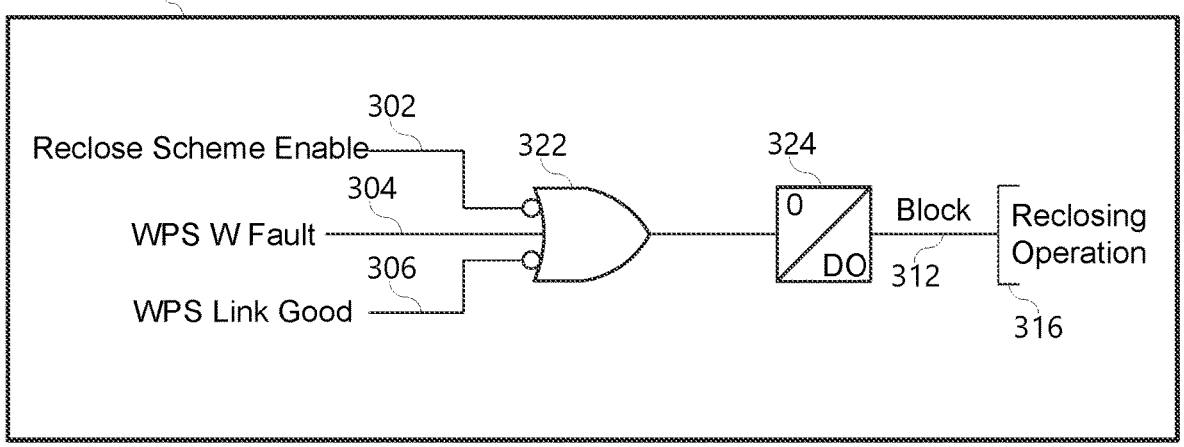
FIG. 3 illustrates a logic diagram for protection reclosing in high-risk zones.

FIG. 3 shows a logic implementation of an embodiment where a conditional protection action uses a WPS signal in a blocking role. As illustrated, a blocking signal 312 is asserted to block reclosing action by the recloser 316 upon certain conditions. In general, the blocking signal 312 is asserted (meaning that reclosing is blocked) when a fault signal 304 from the WPS 222 is received, or the communication link 252 with WPS 222 is unavailable 306. The communication link may become unavailable for a variety of reasons, such as missing data packets, physical communication blockage, loss of power to the WPS 222, or the like.

Put another way, the reclosing is permitted only when the link is good 306 and a fault signal 304 is not received from WPS 222.

Turning to the illustrated logic, OR gate 322 asserts to timer 324 upon receipt of the fault signal 304 from WPS 222, or when the link with WPS 222 is not good 306, or when a reclose scheme enable signal 302 is not present. The timer may include a pickup time and a dropout time. As illustrated, the pickup time is set to zero, such that the timer 324 asserts the blocking signal 312 without any delay upon receiving the signal from OR gate 322. The dropout may be set at commissioning time, and may be long enough to allow for additional protection before any reclosing. The timer may be set to be on the order of around 30 minutes. The 30-minute dropout delay provides extended reclose blocking while performing recloser 242 backup protection, even if recloser 242 seasonal reclosing is unintentionally left enabled. In this example, the WPS 222 fault (e.g. overcurrent) pickup setting should be set a small margin above seasonal peak load current and below the recloser 242 overcurrent pickup level to assure fault signal 304 is generated even for faults below the recloser 242 detection range.

The logic may be configured to include a user reclose scheme enable signal 302. The user may deassert the reclose scheme enable to override the blocking signal logic such that the blocking signal 312 is permanently asserted in the absence of the user reclose scheme enable 302. In this way, a user may be able to prevent reclosing independent of WPS 222 signals.

In another example (illustrated in FIG. 2), recloser 242 may receive power system condition signals 254, 256, 258 from WPSs 224, 226, and 228. As recloser 242 is configured to protect a high-risk zone 152, it may be configured to block reclosing upon detection of a fault condition. In order to reduce the area of outage, recloser 242 may be configured to enable reclosing attempts if it is confirmed that the fault is outside of the high-risk zone 152. Recloser 242 may be configured to enable reclosing if it receives a fault signal 258 from WPS 228. The fault signal 258 from WPS 228 indicates that the fault is outside of the high-risk zone 152, and so reclosing may be attempted. This is an example of a conditional protective action (reclosing) affected by a fault signal from WPS 228 in an enabling role.

In other embodiments, signals from wireless sensors may be used in an enablement role. For example, signals from wireless sensors that indicate a fault condition may be used to enable a conditional reclose for a portion of the power system that includes a sectionalizer. Minimizing fault energy in the high-risk zone by using a nonreclose policy compromises system availability when a main-line fault is temporary. Any fault that causes recloser 242 to trip (and remain open due to the high-risk zone 152) results in a permanent outage to the entire power system downstream of the recloser 242. During high-risk season, the fast time-overcurrent elements may not allow time for a major tap fuse to blow (e.g., Fuse 186 and Fuse 188) or remote zone Fuse 190. The responding crew may need to patrol the entire recloser 242 outage zone even if the original fault was beyond one of the intact fuses.

Figure 4:
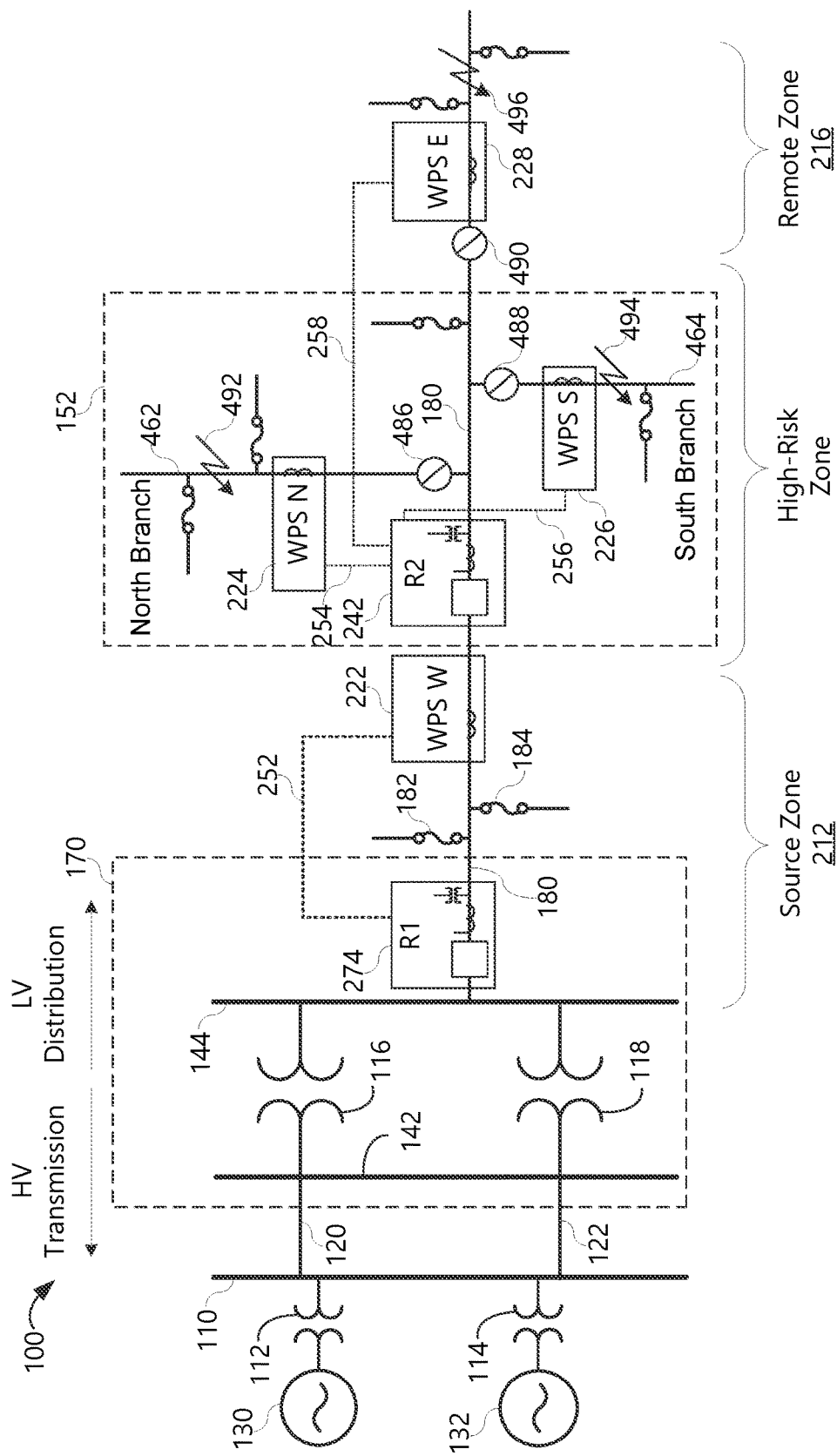
FIG. 4 illustrates a representative one-line diagram of an electric power system including a high-risk area and wireless sensors using sectionalizers.

The system illustrated in FIG. 4 replaces Fuse 186, Fuse 188, and Fuse 190 with electronic sectionalizers, namely: sectionalizer 486, sectionalizer 488, and sectionalizer 490 in series with WPS North (WPS N) 224, WPS South (WPS S) 226, and WPS East (WPS E) 228. In various embodiment, the sectionalizers may be configured to effect a three-phase trip. In various other embodiments, sectionalizers may operate on a per-phase basis. Sectionalizers may be configured to permanently open upon a predetermined number of reclose attempts. For example, a sectionalizer set at one count may be configured to open after one trip; a sectionalizer set at two count may be configured to open on the second open (one trip, followed by a reclose attempt, followed by a trip open). In one embodiment, both sectionalizer 486 and sectionalizer 488 may be configured for one count to operate, and sectionalizer 490 may be configured for two counts. Recloser 242 may be configured with a wireless receiver (or be in communication with a wireless receiver) to receive signals 254, 256, 258 from WPS 224 and WPS 226 on branches in the high-risk zone 152, and WPS 228 of the remote zone 216. Because recloser 242 protects the high-risk zone, the control logic of the recloser 242 may be configured to block reclosing by default, only unblocking in specific conditions. The use of fault condition signals from one or more wireless sensors 224, 226, 228 allows for reclosing in certain situations where reclosing would not have been available; thus allowing for continuing power service to portions of the system that would otherwise have been tripped off due to the high-risk zone protection practices.

In general, recloser 242 is configured to block reclosing unless it receives a permissive signal to attempt a reclose. The permissive signal may be a fault indication from one of the wireless sensors 224, 226, 228. Upon detection of a fault on the respective branches, the wireless sensors may signal 254, 256, 258 a fault indication to the recloser 242. The recloser 242 first trips open upon detection of a fault condition using power system signals available to the recloser 242 using, for example, CTs, PTs, or signals from merging units. The current on the system downstream of the recloser 242 drops to zero upon tripping open of the recloser, at which time any sectionalizer set with a count of one will also open. If the fault indication 254, 256 from a WPS 224, 226 is received, then the recloser 242 may attempt a reclose which, due to configuration of timing, will occur after opening of the sectionalizers 486 or 488. Because the recloser will attempt a reclose only when a WPS indicates a fault condition on the respective branch 462, 464, then the reclose will not be onto a faulted section of the power system. Due to the opening of the sectionalizers, the reclose action will not provide power to the fault. If the fault indication 258 from WPS 228 is received, then the recloser 242 may attempt a reclose.

In one example, a fault 492 occurs on the North branch 462. The fault is detected by recloser 242, recloser 274, and WPS 224. Reclosers 242 and 274 may be coordinated to allow the closest recloser 242 to operate before recloser 274 operates. Recloser 242 may be configured to trip upon detection of a fault and, due to its protection of the high-risk zone 152, not to attempt a reclose unless it receives a permissive signal. WPS 224 may be configured to transmit a fault detection signal to recloser 242, while sectionalizer 486 may be configured to open on the first trip action of recloser 242. Accordingly, upon tripping open of the recloser 242, subsequent opening of the sectionalizer 486, and reclosing of recloser 242, power is restored to a portion of the power system, and the faulted portion (branch 462) remains open. Accordingly, the protection system retains high security while still maximizing the availability of power (in terms of both area and time).

Similarly, a fault 494 on branch 464 would be detected by WPS 226, which would transmit the fault signal 256 to recloser 242. The reclosers 242, 274, and sectionalizer 488 would operate similar to the previous example, thus providing fast protection to the high-risk zone 152 and increasing availability on the power system.

The location of the fault may have several indications. One or more of the reclosers 274, 242 may have been able to calculate a distance to the fault using impedance or traveling wave methods. Furthermore, recloser 242 may have recorded which WPS 224 indicated a fault condition, so the repair crew may be able to use one or more event reports to find which branch is faulted, and a distance to the fault. Finally, the open sectionalizer 486 provides yet another visible indication that the branch 462 is open. Repair crews may then be able to find and clear the faulted condition faster because only one branch needs to be patrolled.

Sectionalizer 490 on the remote zone 216 may be configured with a count greater than the counts of sectionalizers 486 and 488. For example, sectionalizer 490 may be configured with a count of two, where sectionalizers 486 and 488 may be configured with a count of one. Thus, sectionalizer 490 will open on the second trip of recloser 242 or 274. Upon the first reclose attempt of recloser 242, sectionalizer 490 will remain closed, allowing power to be available to the remote zone 216.

In another example, a fault 496 in the remote zone 216 causes WPS 228 to detect the fault 496 and send a fault-detected signal 258 to recloser 242. If no fuse operates to interrupt the fault (e.g. if the fault occurred on a fused branch in the remote zone 216), recloser 242 trips and is permitted to reclose due to WPS E 228 fault identification. If the fault current reappears after reclosing, recloser 242 trips a second time and sectionalizer 490 opens (due to its configured count of two). Recloser 242 may reclose once more. Because the remote zone 216 is isolated by sectionalizer 490 and a current will no longer pass therethrough to feed fault 496, recloser 242 stays closed, restoring service to customers in the high-risk zone 152.

It should be noted that by default, reclosing is blocked and only enabled if recloser 242 trips and the fault is detected by WPS 224, 226, 228. This fail-safe behavior provides a non-reclose state in cases of failed WPS signal reception.

Figure 5:
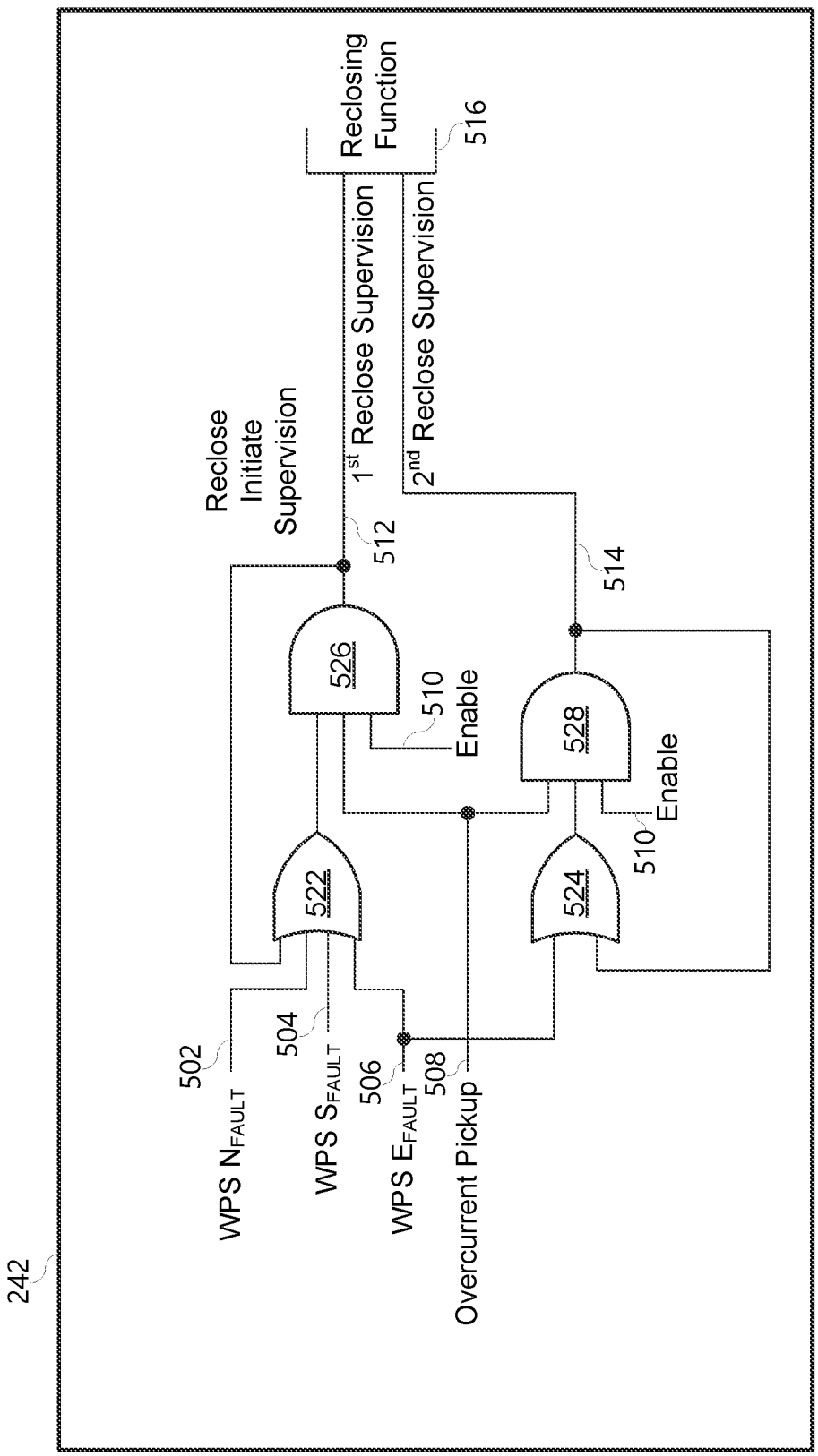
FIG. 5 illustrates a logic diagram for sectionalizing in high-risk zones.

FIG. 5 illustrates a logic for implementation of the reclosing operations for a recloser (such as recloser 242) in accordance with several embodiments herein. The illustrated logic provides the reclosing function 516 permission to initiate a first (512) or second (514) reclosing sequence. The first reclose initiate supervision signal 512 may be asserted by AND gate 526, which asserts upon receipt of an assertion of OR gate 522. The OR gate 522 asserts upon receipt of a fault signal 502, 504, 506 from any of the WPSs reporting to the recloser 242. As illustrated in FIG. 4, WPS 224 may issue fault signal 502 to recloser 242; WPS 226 may issue fault signal 504 to recloser 242; and WPS 228 may issue fault signal 506 to recloser 242. If any of these WPS fault signals 502, 504, 506 are received by recloser 242, OR gate 522 asserts to AND gate 526. AND gate 526 issues a first reclose initiate supervision signal 512 upon receipt of the assertion from OR gate 522, and assertion of both the enable signal 510 and the overcurrent pickup signal 508. The enable signal 510 may be a user enable setting that would allow the recloser 242 to attempt reclose actions.

Upon assertion of all of the OR gate 522, the overcurrent pickup 508, and the user enable 510 signals, then AND gate 526 asserts the first reclose initiate supervision signal 512, allowing the first reclosing function 516. Upon assertion, the first reclose initiate supervision signal 512 is used by the recloser to allow a first reclose attempt after tripping open for the detected overcurrent condition. Further reclose attempts would require additional reclose initiate supervision signals. Furthermore, it should be noted that in accordance with some embodiments, another input to the OR gate 522 is the output of the AND gate 526. Accordingly, upon assertion of the AND gate 526, the OR gate 522 remains asserted to the AND gate 526 regardless of whether the WPS fault signals 502, 504, and 506 subsequently drop out. Furthermore, it should be noted that in several embodiments the overcurrent pickup signal 508 may be provided by a timer with a dropout time that allows the overcurrent pickup 508 to remain asserted for a period of time even after the recloser has tripped open.

Accordingly, the recloser 242 may be permitted to effect a first reclose attempt upon receipt of a fault indication from one of the WPSs 224, 226, 228 on downstream selectively openable (e.g. using a sectionalizer or the like) sections of the power system.

The illustrated logic further allows for a second reclose attempt. In accordance with several embodiments, when a section of power system is selectively-openable by a 2-count sectionalizer 490, two open events are required to isolate that section. When the fault is on that section, the recloser may attempt two trip open actions, and two reclose actions in order for the sectionalizer 490 to isolate the faulted section of line, and to restore power to the unfaulted sections of the power system. Thus, a second reclose initiate supervision signal 514 may be asserted by AND gate 528 upon receipt by OR gate 524 of the fault indication signal 506 related to a fault in a section of the power system selectively openable on a count of two. As before, the AND gate 528 may, in accordance with some embodiments, also require assertion of the overcurrent pickup signal 508 and the enable signal 510. Also, as with the first reclose, the output of the AND gate 528 may be an input to the OR gate 524, resulting in the second reclose permissive signal 514 remaining asserted even if the WPS fault signal 506 drops out.

Accordingly, the recloser 242 may be permitted to effect a second reclose attempt upon receipt of a fault indication from a WPS 228 on a downstream selectively openable on two counts (e.g. using a sectionalizer or the like) section of the power system.

Although FIGS. 4 and 5 illustrate embodiments related to one-count and two-count sectionalizers, more or fewer counts may be used. Furthermore, although two branches in the high-risk zone 152 and a single line in the remote zone 216 are illustrated, more or fewer lines in each of the zones are contemplated, and within the scope if this disclosure.

Figure 6:
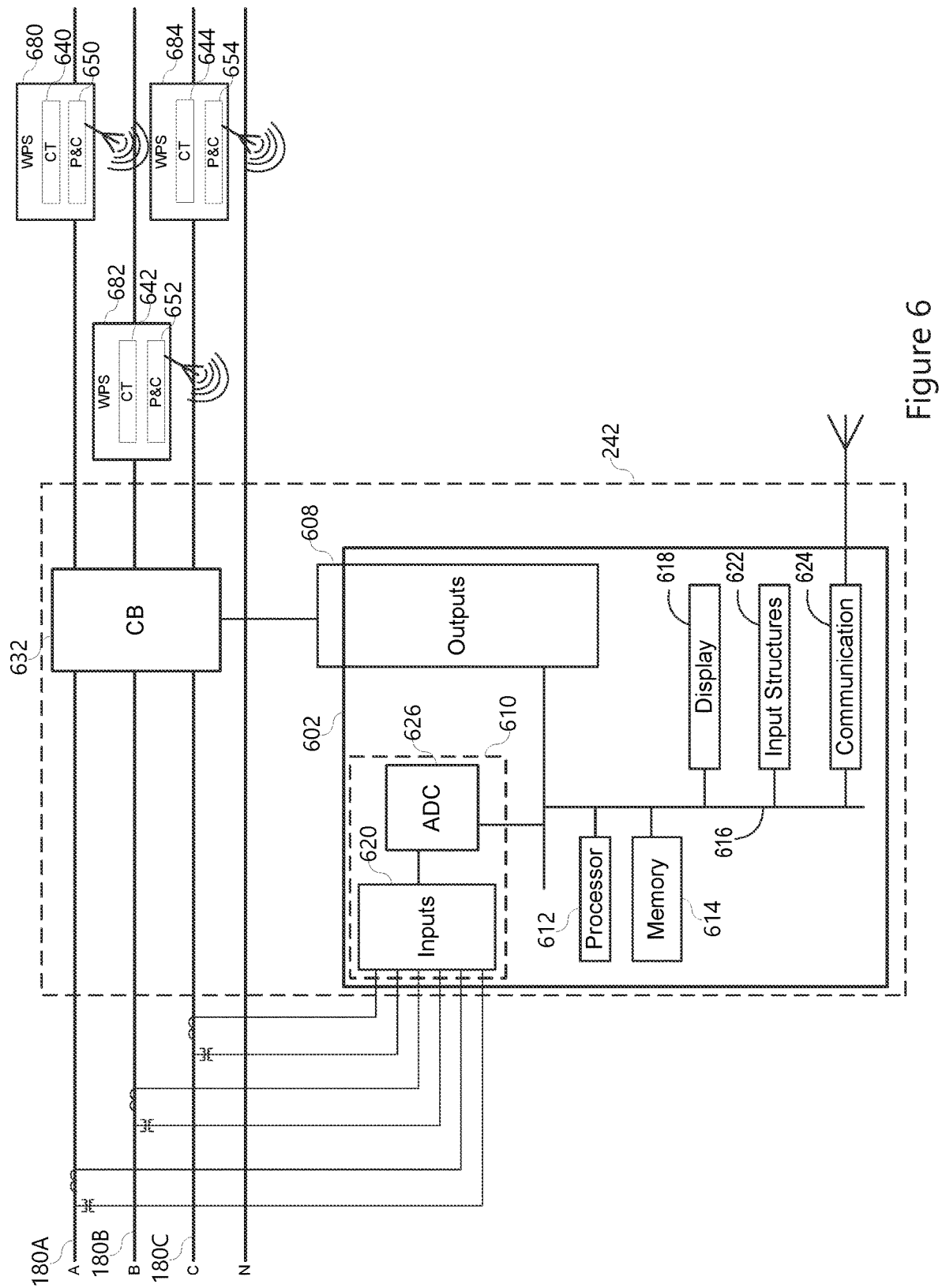
FIG. 6 illustrates a simplified block diagram of an IED and wireless sensors in accordance with several embodiments herein.

FIG. 6 illustrates an embodiment of an example of a three-phase electric power delivery system with a recloser 242 that uses WPSs 680, 682, 684 to monitor current on each phase of a power line 180A, 180B, 180C. In the illustrated example, the recloser may include a controller such as IED 602 that controls electrical connection and disconnection of the power line to a source using a circuit breaker 632 (or other switching device) based at least in part on current measurement and voltage measurements to improve safe operation of the power system. The WPSs 680, 682, 684 may provide one or more communication types to the IED 602 such as, for example, overcurrent status, fault status, current measurements (such as current magnitude), the like. In accordance with several embodiments, herein, the WPRs 680, 682, 684 may provide an indication to the IED 602 of a detected fault on the monitored line. The communication may be direct to the IED 602 or using repeaters, receivers, and combinations thereof. In the illustrated embodiment, single WPSs 680, 682, and 684 are each associated with separate conductors 180A, 180B, 180C, which may be different phases of an electric power delivery system.

The WPSs 680, 682, and 684 may include current transformer windings 640, 642, and 644 and processing and communication circuitry 650, 652, and 654. The current transformer windings 640, 642, and 644 may detect current proportional to the current on the conductors 180A, 180B, 180C associated with the WPSs 680, 682, 384 for monitoring of the electric power delivery system. The processing and communication circuitry 650, 652, and 654 may include any suitable electrical components (e.g., processor, memory, etc.) to communicate current measurements obtained from the windings 640, 642, and 644 to the IED 602. For example, the processing and communication circuitry 650, 652, and 654 may include a transceiver configured to send wireless signals to the transceiver of the IED 602 to communicate current measurements of the phase conductors 180A, 180B, 180C. In various embodiments, the wireless current sensors 680, 682, and 684 may be line-powered and include power harvesting circuitry (e.g., additional CT windings) that harvests power from the power line to allow the wireless current sensors 680, 682, and 684 to perform current measurements and to communicate with the IED 602.

The WPSs 680, 682, and 684 may communicate current magnitude and/or phase measurements to the IED 602. In accordance with various embodiments, the WPSs 680, 682, and 684 may communicate a detected fault condition to the IED 602. For example, a WPS may be configured with a current threshold (which may be, for example, a single threshold, an inverse-time-overcurrent threshold, or the like) such that when the electric power conditions of the conductor associates with the WPS exceed the threshold, the WPS issues a fault signal communicated using the processing and communication circuitry. More specifically, the processing and communication circuitry 650, 652, 654 may include a processing device (e.g. microprocessor, field-programmable gate array, application-specific integrated circuit, or the like) configured to receive signals representative of the current on the conductor from the CT 640, 642, 644, and determine a fault condition using the signals. The fault condition determination may be performed using the current threshold.

The IED 602 may be configured to protect a portion of the electric power delivery system as described herein, to maintain availability of the power system while performing protection even in high-risk areas. The IED 602 may be configured to use fault indications from wireless devices such as WPS 680, 682, 684 as illustrated. The IED 602 may be configured to effect a protective action by signaling a switching device such as a recloser or a circuit breaker 632 to open and/or close. In certain embodiments, the circuit breaker 632 may be capable of opening and closing a single phase at a time. In other embodiments, the circuit breaker 632 may be capable of opening and closing all phases.

The IED 602 in accordance with various embodiments includes a processing device 612 (such as a processor, microprocessor, field-programmable gate array, application-specific integrated circuit, or the like), a computer-readable storage medium 614 (which may be packaged as part of the processing device 612, physically separate from the processing device 612, or include portions that are packaged with the processing device 612 and portions that are separate therefrom), input structures 622, a display 618, output circuitry 608, sensor circuitry 610, and communication circuitry 624. The IED 602 may include one or more bus(es) 616 connecting the processor 612 to the computer-readable storage medium 614, the input structures 622, the display 618, the output circuitry 608, the sensor circuitry 610, and/or the communication circuitry 624. The computer-readable storage medium 614 may be embodied as memory, such as random access memory (RAM), read only memory (ROM), or a combination thereof, and may include or interface with software, hardware, or firmware modules for implementing various portions of the systems and methods described herein. The computer-readable storage medium 614 may be the repository of one or more modules and/or executable instructions configured to implement any of the processes described herein.

The processor 612 may process inputs received via the sensor circuitry 610 and the communication circuitry 624. The processor 612 may operate using any number of processing rates and architectures. The processor 612 may be configured to perform various algorithms and calculations described herein using computer executable instructions stored on computer-readable storage medium 614. The processor 612 and/or the computer-readable storage medium 614 may be referred to generally as processing circuitry.

In accordance with several embodiments, the sensor circuitry 610 may include, for example, inputs 620 that receive signal(s) from one or more sensing devices (e.g., CTs, PTs, and the like). The sensor circuitry 610 may sample and digitize the analog signals using for example, A/D converter(s) 626 to produce digitized signals representative of measured current and/or voltage on one or more conductors 180A, 180B, 180C of the electric power delivery system. The A/D converter(s) 626 may be connected to the processor 612 by way of the bus 616, through which digitized signals may be transmitted to the processor 612.

The communication circuitry 624 may include communication ports, such as ethernet and serial ports. In some embodiments, the IED 602 may remotely control the circuit breaker by using the communication circuitry 624 via merging units, other IEDs, or the like. Further, the communication circuitry 624 may include a wireless transceiver to communicate with one or more electronic devices, such as the WPSs 680, 682, and 684. The IED 602 may include a display screen 618 that displays information to notify an operator of operating parameters of the electric power delivery system, such as current measurements, voltage measurements, circuit breaker status, power flow direction, etc. The input structures 622 may include buttons, controls, universal serial bus (USB) ports, or the like, to allow a user to provide input settings to the IED 602. In some embodiments, the display 618 may be a touchscreen display.

The output circuitry 608 may include one or more output pins or connectors that electrically connect the IED 602 to a switching device such as circuit breaker 632. The output circuitry may facilitate the processor 612 sending control signals to the switching device 632 to control connection or disconnection of a power source.

Figure 7A:
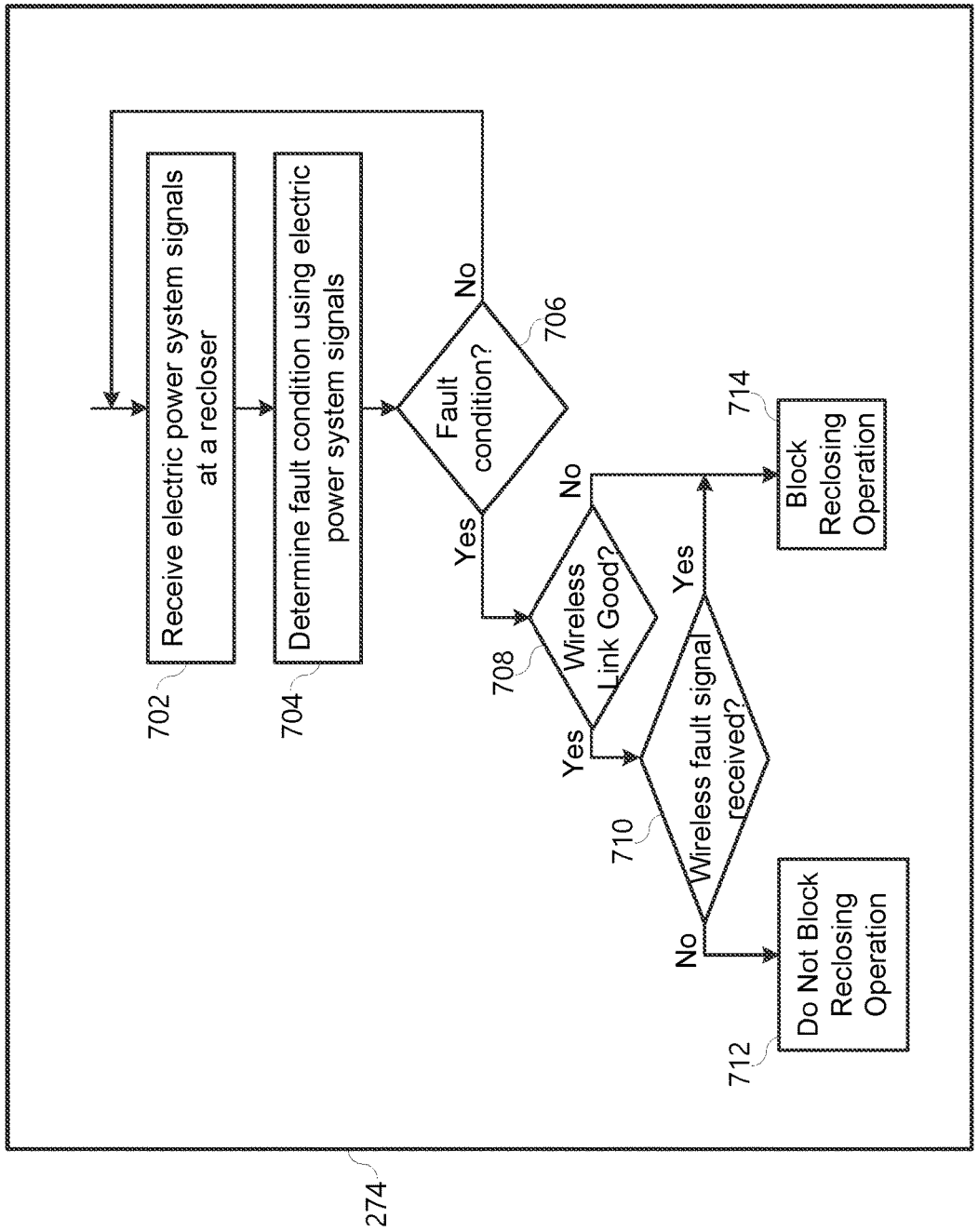
FIGS. 7A and 7B illustrate flow diagrams of a process for using signals from wireless sensors for protection of electric power delivery systems that include a high-risk zone in accordance with several embodiments herein.
Figure 7B:
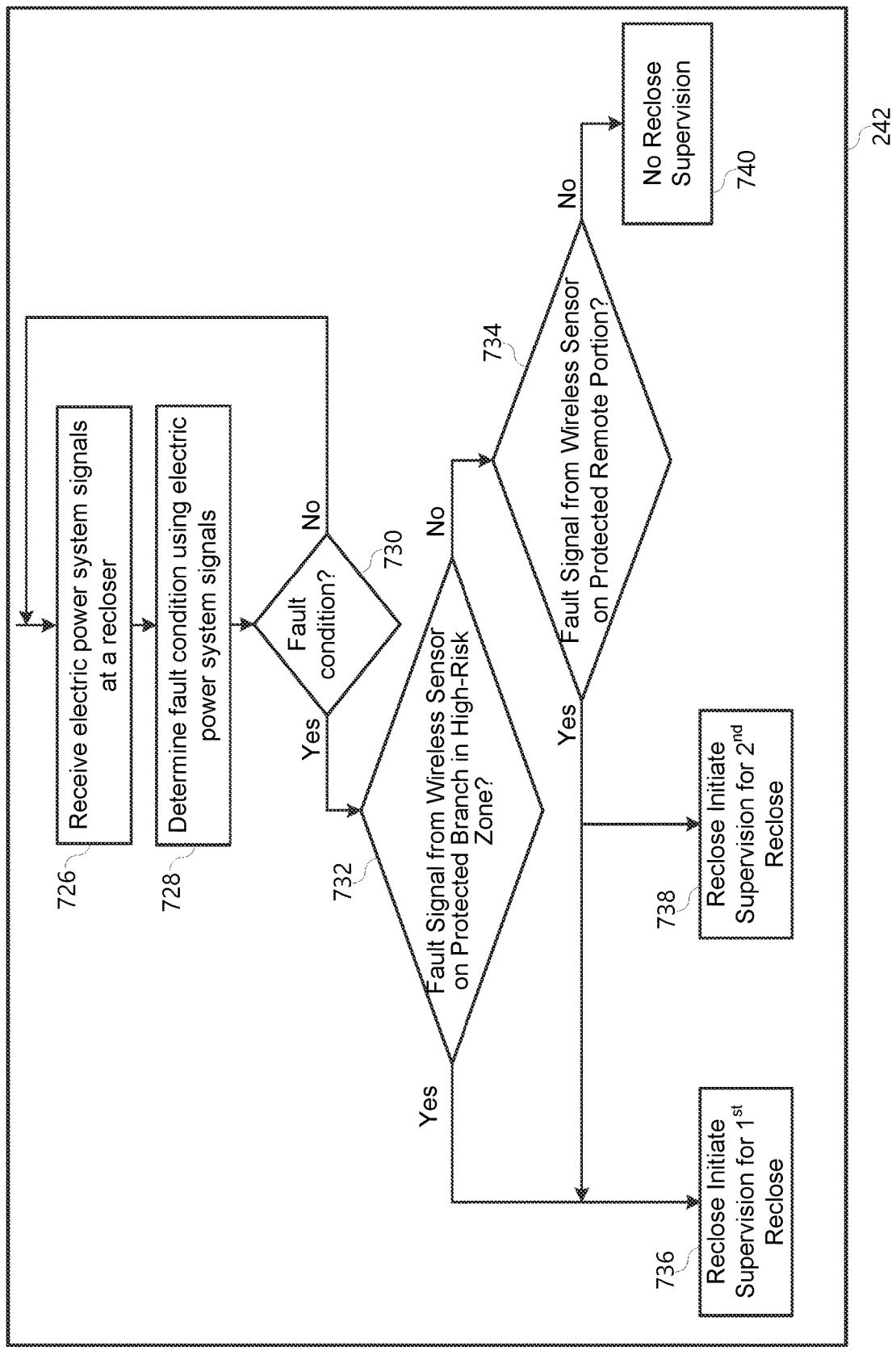

FIGS. 7A and 7B illustrate flow diagrams of methods for protection of an electric power delivery system that includes a high-risk zone in accordance with several embodiments herein. In each figure, the method starts with receiving electric power system signals at a recloser 702, 726 and determining a fault condition using the electric power system signals 704, 728. If a fault condition is not determined 706, 730, the method may return to receiving electric power system signals 702, 726. The systems and devices described herein may be used to receive the signals and determine the fault condition in accordance with the embodiments herein.

In FIG. 7A the illustrated method may be employed in installations in which the wireless sensor is in communication with a feeder to the high-risk area, such as in illustrated as recloser 274 of FIGS. 2 and 4. When a fault condition is determined at 706, the method continues to determine if the wireless link is good 708. If the communication link is unavailable, the method may proceed to block a reclosing operation 714. This may result in additional security against reclosing onto a high-risk zone when it is unknown whether the reclosing would be onto a fault in a high-risk zone.

If the wireless link is good 708, the method may determine whether the wireless fault signal is received 710. If the wireless fault signal is received 710 (indicating that the fault is fed by the feeder to the high-risk zone), then the method may block the reclosing operation 714. Once again, such blocking may result in additional security against reclosing onto a high-risk zone when it is unknown whether the reclosing would be onto a fault in a high-risk zone. If, however, the wireless fault signal is not received, the method does not block the reclosing operation 712.

Turning to FIG. 7B, the method may be applied in embodiments in which wireless sensors are positioned on protected branches from the feeder in the high-risk zone, or on protected branches in remote areas of the power system outside of the high-risk zone and report to a recloser such as 242 of FIGS. 2 and 4. If a fault condition is determined 730, the method may determine if a fault signal is received from a wireless sensor on a protected branch in a high-risk zone 732, or on a protected remote portion 734. As discussed above, the protected portions or branches may be protected by sectionalizers. If the wireless sensor is on a protected branch in the high-risk zone 732 or is on a protected remote portion 734, then the method enables the 15$t$ reclosing operation 736. The reclosing operation may be enabled as discussed above, depending on the configuration of the protection devices of the corresponding portion of the power system. If the fault signal is not received from any wireless sensor, then the method does not enable the reclosing operation 740. If the fault signal is received from the protected remote portion 734, then the method enables the $1^{st}$ and $2^{nd}$ reclosing operation 736 and 738. Thus, if the fault is not indicated as corresponding with the protected portion, the method does not reclose, thus adding security by not reclosing onto a fault in a high-risk zone.

Accordingly, described herein are improvements to electric power system protection in high-risk zones. Improvements include, for example, retaining safe protection in high-risk zones while maintaining power availability in non-faulted portions of the electric power delivery system. It should be noted that although reference is made herein to a "high-risk zone" the systems and methods may be applied to any portion of an electric power delivery system to which an operator has determined power should not be transmitted when a fault is present. An area may be designated as a "high-risk zone" by an operator, and does not necessarily require or refer to an objective nature of the portion of the power system itself.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A recloser for protecting a high-risk zone of an electric power delivery system, comprising:
    a switching device in electrical communication with the electric power delivery system for selectively opening and closing;
    an intelligent electronic device (IED) in communication with the switching device and the electric power delivery system, comprising:
        an output for sending control signals to the switching device;
        an input for receiving electric signals from the electric power delivery system;
        an input for receiving a fault indication signal wirelessly transmitted from a wireless sensor in electrical communication with a portion of the electric power delivery system, the fault indication signal corresponding to an electrical condition of the high-risk zone;
        a memory;
        a processor operatively coupled to the memory, configured to:
            acquire the electric signals;
            determine a fault condition using the electric signals;
            signal the switching device to trip open upon determination of the fault condition;
            acquire the fault indication signal from the wireless sensor;
            enable a reclose operation for the switching device to close based on the fault indication signal from the wireless sensor; and,
            signal the switching device to close only upon enablement of the reclose operation.

2. The recloser of claim 1, wherein the wireless sensor is in electrical communication with a feeder to the high-risk zone.

3. The recloser of claim 2, wherein the processor blocks enablement of the reclose operation when the fault indication signal is received from the wireless sensor.

4. The recloser of claim 2, wherein the processor blocks enablement of the reclose operation when a signal from the wireless sensor is unavailable.

5. The recloser of claim 3, wherein the processor blocks enablement of the reclose operation for a predetermined time upon receipt of the fault indication signal from the wireless sensor.

6. The recloser of claim 1, wherein the wireless sensor is in electrical communication with a protected branch in the high-risk zone.

7. The recloser of claim 6, wherein the processor enables the reclose operation when the fault indication signal is received from the wireless sensor.

8. The recloser of claim 7, wherein the protected branch includes a sectionalizer configured to open after one trip open by the switching device.

9. The recloser of claim 1, wherein the wireless sensor is in electrical communication with a protected portion of the electric power delivery system downstream of the high-risk zone.

10. The recloser of claim 9, wherein the processor enables the reclose operation when the fault indication signal is received from the wireless sensor.

11. The recloser of claim 10, wherein the protected portion of the electric power delivery system includes a sectionalizer configured to open after two trip open operations by the switching device.

12. The recloser of claim 11, wherein the processor enables two reclose operations when the fault indication signal is received from the wireless sensor.

13. A method for secure protection of an electric power delivery system that includes a high-risk zone, comprising:
    receiving electric power delivery system signals at an intelligent electronic device (IED) in communication with a switching device that is operable to selectively trip open and reclose an electrical path to the high-risk zone of the electric power delivery system;
    determining a fault condition using the electric power delivery system signals;
    receiving, at the IED, communication from a wireless sensor remote from the IED;
    upon determining a fault condition, the IED effecting a protective action by signaling the switching device to trip open;
    determining a reclose operation for the switching device to close using a communication from the wireless sensor; and,
    upon determining a reclose operation, effecting the reclose operation by signaling the switching device to close.

14. The method of claim 13, further comprising the steps of:
    determining whether the communication link with the wireless device on a feeder to the high-risk zone is available, and;
    when the communication link is unavailable, blocking the reclose operation.

15. The method of claim 13, wherein the wireless sensor is in electrical communication with a feeder to the high-risk zone, the method further comprising the steps of:
    determining whether the communication from the wireless sensor comprises a fault indication; and,
    when the communication from the wireless sensor comprises a fault indication, blocking the reclose operation.

16. The method of claim 13, wherein the wireless sensor is in electrical communication with a protected branch of the high-risk zone, the method further comprising the steps of:
    determining whether the communication from the wireless sensor comprises a fault indication; and,
    when the communication from the wireless sensor comprises a fault indication, enabling the reclose operation.

17. The method of claim 13, wherein the wireless sensor is in electrical communication with a protected area remote of the high-risk zone, the method further comprising the steps of:
    determining whether the communication from the wireless sensor comprises a fault indication; and,
    when the communication from the wireless sensor comprises a fault indication, enabling the reclose operation.

18. The method of claim 17, wherein the method further comprises the steps of:
    after the reclose operation, determining if the fault condition persists; and
    upon determination that the fault condition persists, effecting a subsequent protective action by signaling the switching device to trip open;
    after a predetermined time, effect a subsequent reclose operation by signaling the switching device to reclose.

19. A system for protecting an electric power delivery system that includes an area designated as a high-risk zone, the system comprising:
    a wireless sensor in communication with a conductor of the electric power delivery system, and includes a wireless transmitter for wirelessly transmitting power system conditions determined using electric power system signals;
a switching device in electrical communication with the electric power delivery system for selectively opening and closing;
an intelligent electronic device (IED) in electrical communication with the electric power delivery system for receiving electric power signals therefrom, comprising:
an output for sending control signals to the switching device;
an input for receiving electric signals from the electric power delivery system;
an input for receiving the wirelessly transmitted power system conditions from the wireless sensor;
a memory;
a processor operatively coupled to the memory, configured to:
determine a fault condition using the electric power system signals obtained by the IED;
signal the switching device to trip open upon determination of the fault condition;
acquire the wirelessly transmitted power system conditions from the wireless sensor;
enable a reclose operation for the switching device to close based on the wirelessly transmitted power system conditions; and,
signal the switching device to close only upon enablement of the reclose operation.

20. The system of claim 19, wherein the processor is further configured to:
block the reclose operation when the wirelessly transmitted power system conditions are unavailable;
block the reclose operation when the wirelessly transmitted power system conditions indicate a fault condition from a feeder to the area designated as the high-risk zone;
enable the reclose operation when the wirelessly transmitted power system conditions indicate a fault condition from a protected branch within the area designated as the high-risk zone; and
enable the reclose operation when the wirelessly transmitted power system conditions indicate a fault condition from a protected area remote from the area designated as the high-risk zone.

* * * * *